(12) United States Patent
De Bernardinis

(10) Patent No.: US 10,749,662 B1
(45) Date of Patent: Aug. 18, 2020

(54) BAUD-RATE TIME ERROR DETECTOR

(71) Applicant: Inphi Corporation, Santa Clara, CA (US)

(72) Inventor: Fernando De Bernardinis, Pavia (IT)

(73) Assignee: INPHI CORPORATION, Santa Clara, CA (US)

(*) Notice: Subject to any disclaimer, the term of this patent is extended or adjusted under 35 U.S.C. 154(b) by 0 days.

(21) Appl. No.: 16/358,687

(22) Filed: Mar. 19, 2019

(51) Int. Cl.
*H04L 7/027* (2006.01)
(52) U.S. Cl.
CPC .................................. *H04L 7/027* (2013.01)
(58) Field of Classification Search
CPC .. H04B 2001/70706; H04L 2027/0055; H04L 27/0014; H04L 7/0079; H04L 7/00
See application file for complete search history.

(56) References Cited

U.S. PATENT DOCUMENTS

| | | | | |
|---|---|---|---|---|
| 2003/0186666 | A1* | 10/2003 | Sindhushayana | H04L 7/0054 455/260 |
| 2010/0011355 | A1* | 1/2010 | Carrigan | G06F 3/023 718/1 |
| 2016/0352557 | A1* | 12/2016 | Liao | H04L 27/3809 |

OTHER PUBLICATIONS

Mueller, K., et al., "Timing Recovery in Digital Synchronous Data Receivers," IEEE Transactions on Communications, May 1976, pp. 516-531, vol. COM-24, No. 5, can be retrieved at <URL:https://pdfs.semanticscholar.org/ef0a/539a61e05df52faeeeb8ca408e2f12575a8b.pdf>.

* cited by examiner

*Primary Examiner* — David S Huang
(74) *Attorney, Agent, or Firm* — Richard T. Ogawa; Ogawa P.C.

(57) ABSTRACT

A receiver system that includes a clock and data recovery (CDR) system for aligning a local clock signal to an incoming data signal to extract correct timing information from the incoming data signal is provided. A timing error detector generates an output phase error signal representing the phase difference between the incoming data signal and the local clock signal. The timing error detector determines the phase difference according to recovered symbols and the difference between the recovered symbols and digital samples of the incoming data signal. The digital samples of the incoming data signal include intersymbol interference. The output timing information is suitable for aligning the local clock signal to the incoming data signal.

6 Claims, 3 Drawing Sheets

BAUD-RATE TIME ERROR DETECTOR

BACKGROUND

1. Field of the Disclosure

This disclosure pertains in general to digital receiver, and more specifically to timing error detection.

2. Description of the Related Art

One of the important functions of communication receivers is to maintain symbol synchronization. In a digital receiver, clock and data recovery (CDR) systems are used to recover the clock and data from a received signal. The received signal should be sampled at the accurate timing instants to recover the data. To accurately recover the data, some CDR systems double sample the received signal at the local clock signal. That is, two samples are taken in each period. However, in systems that cannot afford double sampling the received signal, the local clock signal is inferred from ISI (intersymbol interference) content of the sampled data. The local clock signal is locked if the ISI content of the previous sample equals to the ISI content of the next sample. In these systems, if the ISI content is too low, the difference between ISI content of the previous sample and the next sample may be too small and unreliable, which results in loss of symbol synchronization. As a result, an improved timing error detection is needed to accurately track and correct any substantial deviation or drift in the clock signal.

SUMMARY

A receiver system that includes a clock and data recovery (CDR) system for aligning a local clock signal to an incoming data signal to extract correct timing information from the incoming data signal is provided. A timing error detector generates an output phase error signal representing the phase difference between the incoming data signal and the local clock signal. The timing error detector determines the phase difference according to recovered symbols and the difference between the recovered symbols and digital samples of the incoming data signal. The digital samples of the incoming data signal include intersymbol interference. The output timing information is suitable for aligning the local clock signal to the incoming data signal.

Other aspects include components, devices, systems, improvements, methods, processes, applications and other technologies related to the foregoing.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Figure 1:
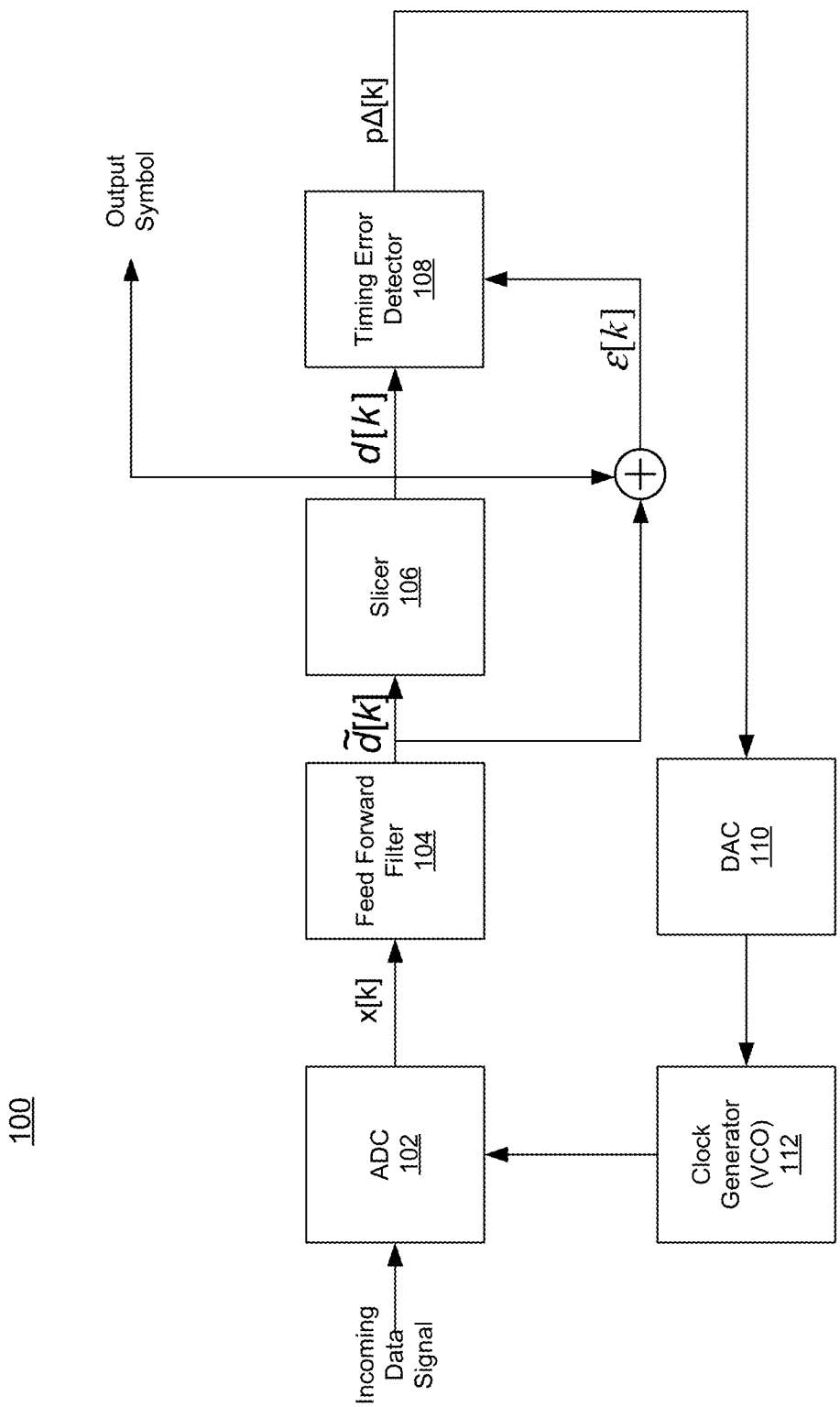
FIG. 1 is a block diagram illustrating an example receiver system 100 for recovering transmitted data from a received data signal, according to one embodiment.

FIG. 1 is a block diagram illustrating an example receiver system 100 for recovering transmitted data from a received data signal, according to one embodiment. The receiver system 100 receives an incoming data signal and outputs symbols $\tilde{d}[k]$. The receiver system 100 includes an analog to digital converter (ADC) 102, a feed forward filter 104, a slicer 106, a timing error detector (TED) 108, a digital to analog converter (DAC) 110, and a clock generation (VCO) 112. The ADC 102 converts an incoming analog data signal to a digital signal x[k]. The digital signal x[k] includes the data signal and noise. The ADC 102 is driven by a local clock signal, generated in this example by the clock generator 112. The sample can be taken at a rising edge or a falling edge of the clock signal. The incoming data signal is the baseband signal representing one or more symbols. The one or more symbols are modulation symbols that are modulated onto a carrier signal. The digital signal x[k] is a series of samples of the baseband signal.

The feedforward filter 104 conditions the digital signal x[k] by mitigating intersymbol interference and provides the filtered signal $\tilde{d}[k]$ to the slicer 106. The slicer 106 determines a symbol d[k] associated with the digital signal $\tilde{d}[k]$. Compared to the filtered signal $\tilde{d}[k]$ that may be affected by ISI (intersymbol interference) and noise, the symbol d[k] is one entry of the symbol alphabet.

The local clock signal ideally is synchronized to the incoming data signal. However, in the receiver system 100, the local clock signal is generated locally by the clock generator 112. The local clock signal is synchronized to the incoming data signal by a feedback loop which in this example includes the timing error detector 108.

The TED 108 detects the phase difference between the incoming data signal and the local clock signal. The TED 108 generates an output phase error signal representing the phase difference between the incoming data signal and the local clock signal. The phase error signal may indicate whether the local clock signal is leading or lagging the incoming data signal. In various embodiments, the TED 108 determines the phase difference based on the symbol d[k] recovered at a time k and the difference signal ε[k]. The difference signal is the difference between the filtered signal $\tilde{d}[k]$ that is used to recover the symbol d[k] and the recovered symbol d[k]. The output phase error signal is provided to a Digital to Analog Converter (DAC) 110 to generate a voltage signal. The output phase error signal may be filtered by a loop filter (not shown) before being provided to the DAC 110. The voltage signal is applied as an input to the clock generator 112. The clock generator 112 may include a voltage-controlled oscillator (VCO) with variable frequency capability. The clock generator 112 adjusts the local clock signal according to the control voltage.

The feedback loop may further include a loop filter (not shown) that controls the frequency range of an incoming data signal to which a local clock signal can lock and how fast the local clock signal locks to the incoming data signal. The loop filter determines the stability of the feedback loop. In some embodiments, the feedback loop may include a frequency changing element such as a frequency divider, a frequency multiplier, and/or a mixer such that the output of the clock generator 112 is locked to a reference signal which has a frequency that is a multiple or a sub-multiple of the frequency of the incoming data signal.

The receiver system 100 may further include other components such as an antenna, a preprocessor, an analog equalizer, variable gain amplifiers and a Decision Feedback Loop. The receiver system 100 may be a part of a device such as a network switch, an optical module, a hard disk interface, a high speed computer interface, a digital video processing device.

Figure 2:
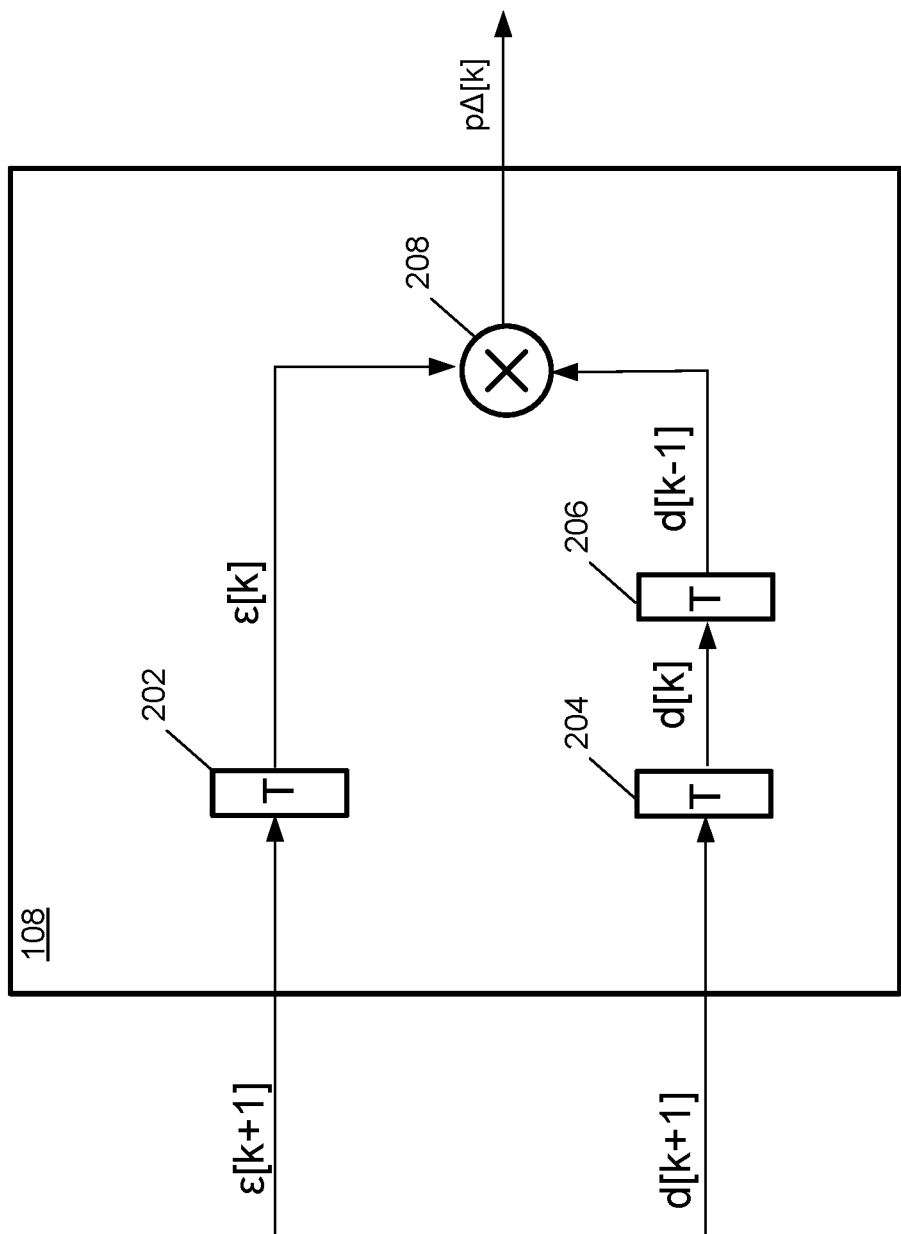
FIG. 2 is a block diagram illustrating an example TED, suitable for use in the receiver system 100 of FIG. 1.

FIG. 2 is a block diagram illustrating an example of the TED 108, suitable for use in the receiver system 100 of FIG. 1. The example TED 108 receives a first input signal d[k] that is the symbol recovered at a time k, and a second input signal ε[k] that is the difference between the filtered signal d̃[k] used to recover the symbol d[k] and the recovered symbol d[k]. The TED 108 includes delay elements 202, 204, 206, and a multiplier 208. The first delay element 202 is coupled to the input terminal and stores the input signal ε[k] for a symbol time period T. The second delay element 204 and the third delay element 206 are coupled in series and coupled to the second input terminal along the signal path for the input signal d[k]. The second delay element 204 and the third delay element 206 each store the input signal d[k] for a symbol time period T. At a given time k, the multiplier 208 multiplies the signal ε[k] and the d[k−1]. The TED 108 determines the phase difference according to Equation (1):

$$p\Delta[k] = (d[k] - \tilde{d}[k]) * d[k-1] - S_{TH} \quad (1),$$

where $S_{TH}$ is a sampling threshold. In the illustrated example, the sampling threshold is 0.

In other embodiments, the TED 108 may determine the phase difference according to Equation (2):

$$p\Delta[k] = (d[k] - \tilde{d}[k]) * d[k+1] - S_{TH} \quad (2),$$

where $S_{TH}$ is a sampling threshold.

Figure 3:
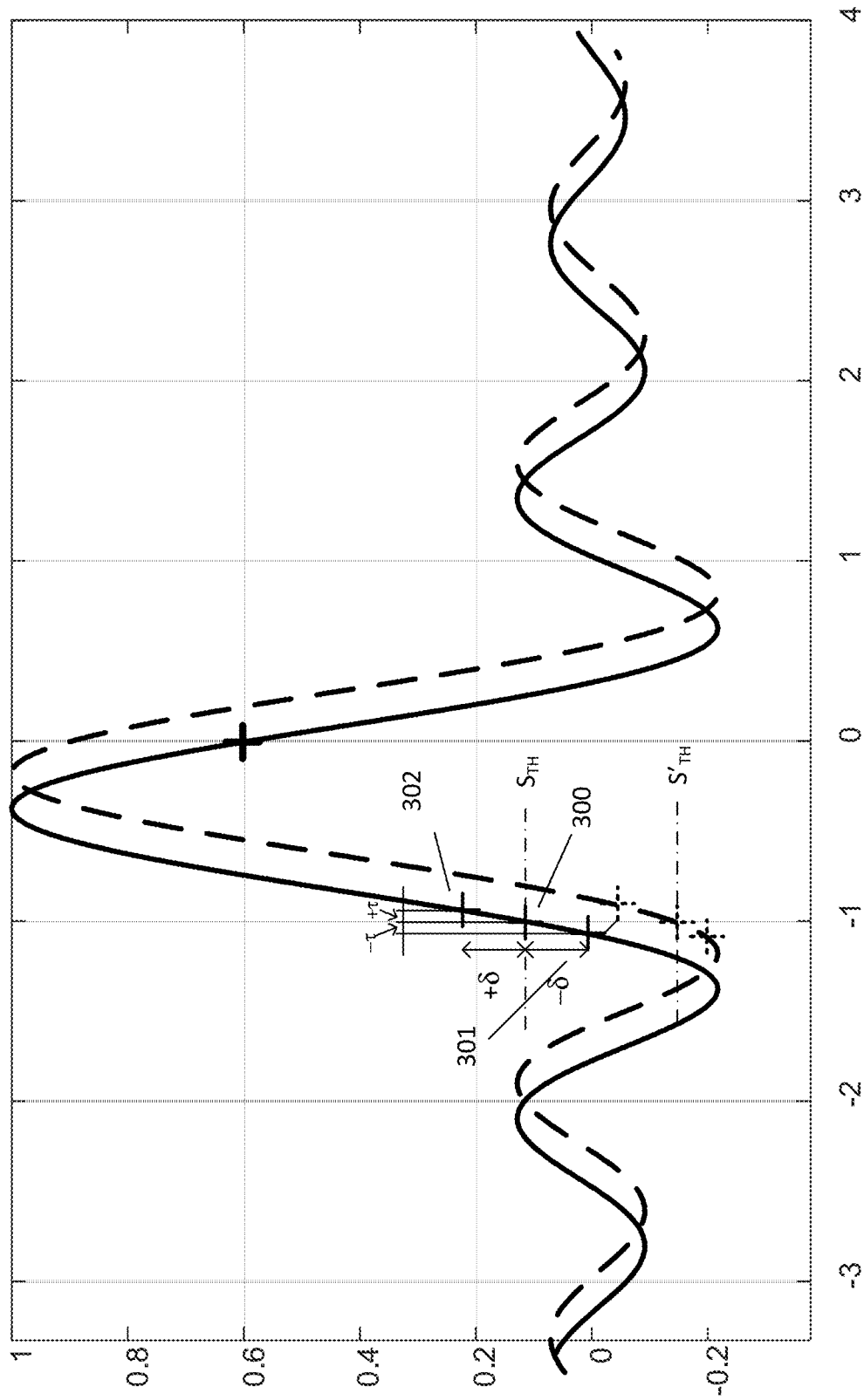
FIG. 3 illustrates the operation of an example TED as a function of the incoming impulse response waveforms.

FIG. 3 illustrates the operation of an example TED as a function of the incoming impulse response waveforms. The optimal sampling point is obtained when the TED output is 0 and the equilibrium point is stable. If the impulse signal is correctly sampled, the impulse response h[−1] 300 equals to the threshold $S_{TH}$. However, if the impulse signal is sampled early (or late), the impulse response h[−1] 301 (or 302) is 8 less than (or greater than) the threshold $S_{TH}$. In these two cases, the TED outputs opposite signs, which generates a phase error at the TED output for correcting the sampling phase as described in connection with FIG. 1. Adjusting the threshold $S_{TH}$ to $S'_{TH}$ will change the sampling time.

Upon reading this disclosure, those of skill in the art will appreciate still additional alternative designs. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A clock and data recovery device for aligning a local clock signal to an incoming data signal, the device comprising:
   a timing detector comprising a first input terminal, a second input terminal, and an output terminal, the timing detector configured to:
      receive a first input signal at the first input terminal, the first input signal representative of a series of symbols,
      receive a second input signal at the second input terminal, the second input signal representative of a difference between the first input signal and a digital signal, the digital signal including a series of digital samples of the incoming data signal including the series of symbols, each digital sample being taken according to a rising edge of the local clock signal,
      determine a timing adjustment of the clock signal based on the first input signal and the second input signal, the timing adjustment configured to adjust rising edges of the clock signal, and
      output the timing adjustment at the output terminal,
   wherein a value of the timing adjustment for a current symbol period is a multiplication of a value of the first input signal at the current symbol period and a value of the second signal at the previous symbol period.

2. The clock and data recovery device of claim 1, further comprising a clock generator coupled to the output terminal of the timing detector and to receive the timing adjustment, the clock generator configured to generate the local clock signal and to adjust the rising edges of the local clock signal according to the timing adjustment.

3. The clock and data recovery device of claim 1, wherein a clock generator is configured to adjust a rising edge of the clock signal for a next symbol period according to a value of the timing adjustment for a current symbol period.

4. The clock and data recovery device of claim 1, wherein the timing detector comprises a first delay circuit coupled to the first input terminal, the first delay circuit configured to delay the first input signal by a symbol period.

5. A clock and data recovery device for aligning a local clock signal to an incoming data signal, the device comprising:
   a timing detector comprising a first input terminal, a second input terminal, and an output terminal, the timing detector configured to:
      receive a first input signal at the first input terminal, the first input signal representative of a series of symbols,
      receive a second input signal at the second input terminal, the second input signal representative of a difference between the first input signal and a digital signal, the digital signal including a series of digital samples of the incoming data signal including the series of symbols, each digital sample being taken according to a rising edge of the local clock signal,
      determine a timing adjustment of the clock signal based on the first input signal and the second input signal, the timing adjustment configured to adjust rising edges of the clock signal, and
      output the timing adjustment at the output terminal,
   wherein the timing detector comprises a first delay circuit coupled to the first input terminal, the first delay circuit configured to delay the first input signal by a symbol period, and
   wherein the timing detector comprises a second delay circuit coupled to the second input terminal, the second delay circuit configured to delay the second input signal by two symbol periods.

6. The clock and data recovery device of claim 5, wherein the timing detector comprises a multiplier coupled to the first delay circuit, the second delay circuit, and the output terminal, the multiplier configured to multiply a first delayed signal and a second delayed signal.

* * * * *